US010645686B2

(12) United States Patent
Baldemair et al.

(10) Patent No.: US 10,645,686 B2
(45) Date of Patent: May 5, 2020

(54) RESOURCE RESERVATION PROTOCOL FOR WIRELESS BACKHAUL

(71) Applicant: TELEFONAKTIEBOLAGET LM ERICSSON (PUBL), Stockholm (SE)

(72) Inventors: Robert Baldemair, Solna (SE); Jonas Kronander, Knivsta (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 252 days.

(21) Appl. No.: 15/543,511

(22) PCT Filed: Jan. 16, 2015

(86) PCT No.: PCT/EP2015/050784
§ 371 (c)(1),
(2) Date: Jul. 13, 2017

(87) PCT Pub. No.: WO2016/112995
PCT Pub. Date: Jul. 21, 2016

(65) Prior Publication Data
US 2018/0007687 A1 Jan. 4, 2018

(51) Int. Cl.
*H04L 12/801* (2013.01)
*H04L 12/851* (2013.01)
(Continued)

(52) U.S. Cl.
CPC ....... *H04W 72/0426* (2013.01); *H04W 16/14* (2013.01); *H04W 40/023* (2013.01); *H04L 47/14* (2013.01); *H04L 47/24* (2013.01)

(58) Field of Classification Search
CPC ........... H04W 72/0426; H04W 40/023; H04W 40/34–37; H04W 16/14
See application file for complete search history.

(56) References Cited

U.S. PATENT DOCUMENTS 10,098,040 B2* 10/2018 Kronander ............ H04W 16/10
2008/0181173 A1 7/2008 Wei
(Continued)

FOREIGN PATENT DOCUMENTS

WO 2015110147 A1 7/2015

OTHER PUBLICATIONS

Carlson, Emma et al., "A Distributed End-to-End Reservation Protocol for IEEE 802.11-Based Wireless Mesh Networks", IEEE Journal on Selected Areas in Communications, vol. 24, No. 11, Nov. 2006, 2018-2027.

(Continued)

*Primary Examiner* — Charles C Jiang
*Assistant Examiner* — Voster Preval
(74) *Attorney, Agent, or Firm* — Patent Portfolio Builders, PLLC

(57) ABSTRACT

The present disclosure generally relates to the field of resource reservation. More specifically, the present disclosure relates to a technique of reserving communication resources in a wireless communication network. A method embodiment comprises: receiving (S402), by a node of the plurality of nodes, a resource reservation message including first reservation information indicating one or more communication resources for at least one link of the wireless communication network; modifying (S404), by the node, the received resource reservation message by including second reservation information indicating one or more communication resources for a link of the node in the received resource reservation message; and transmitting (S406), by the node, the modified resource reservation message to one or more neighbor nodes of the node.

21 Claims, 9 Drawing Sheets

(51) Int. Cl.
  *H04W 72/04* (2009.01)
  *H04W 16/14* (2009.01)
  *H04W 40/02* (2009.01)

(56) References Cited

U.S. PATENT DOCUMENTS

2009/0052319 A1* 2/2009 Muqattash ............ H04L 45/302
  370/230.1
2017/0359731 A1* 12/2017 Soldati .................. H04W 16/14

OTHER PUBLICATIONS

Harai, Hiroaki et al., "Establishing Lightpaths of an Optical Ring for Distributed Computing Environment", 2nd International Conference on Broadband Networks, BroadNets 2005, Oct. 2005, 488-495.

Hui, Dennis et al., "Joint Routing and Resource Allocation for Wireless Self-Backhaul in an Indoor Ultra-Dense Network", 2013 IEEE 24th International Symposium on Personal, Indoor and Mobile Radio Communications: Mobile and Wireless Networks, Sep. 2013, 3083-3088.

Popovski, Petar et al., "Mobile and Wireless Communications Enablers for the Twenty-twenty Information Society", METIS—Deliverable D2.3 Components of a new air interface—building blocks and performance, ICT-317669, Apr. 30, 2014, 1-118.

Tipmongkolsilp, Orawan et al., "The Evolution of Cellular Backhaul Technologies: Current Issues and Future Trends", IEEE Communications Surveys & Tutorials, vol. 13, No. 1, May 2010, 97-113.

* cited by examiner

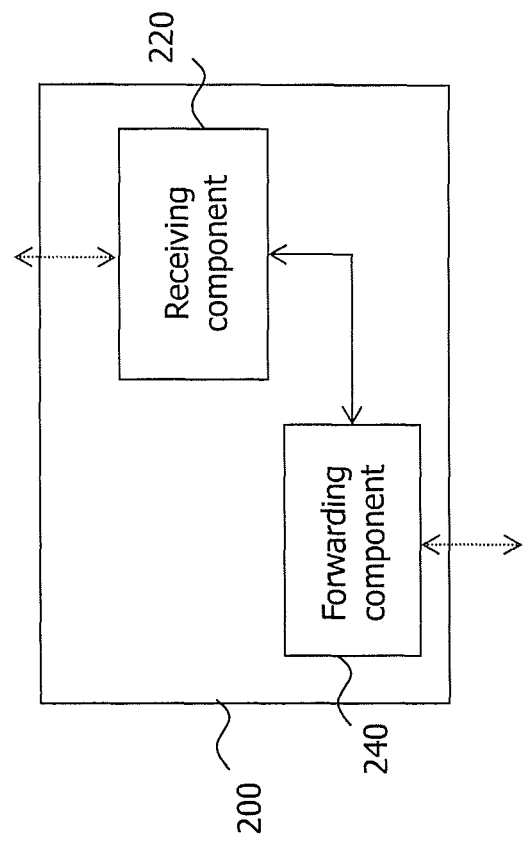
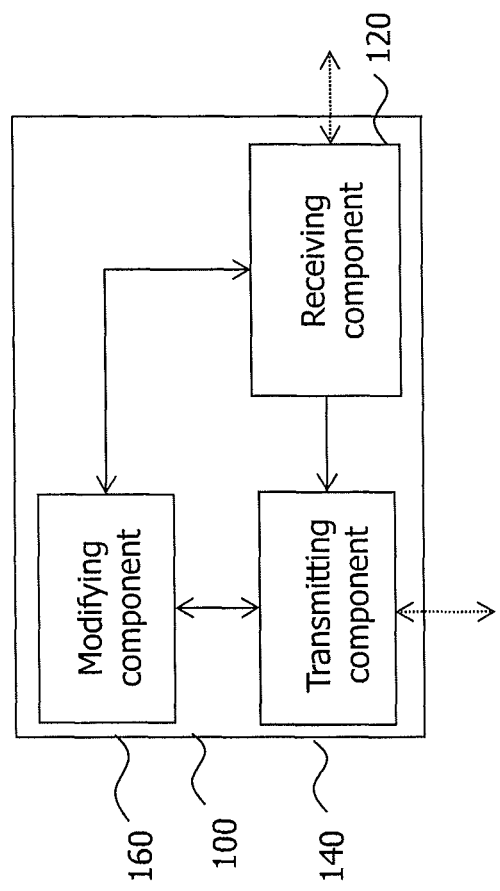
Fig. 3b
Fig. 3a

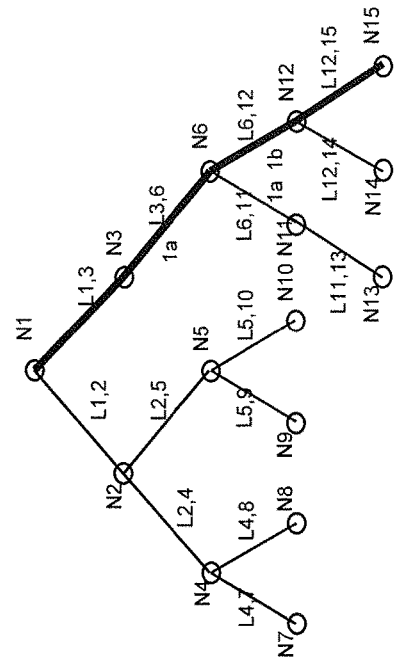
Fig. 6b
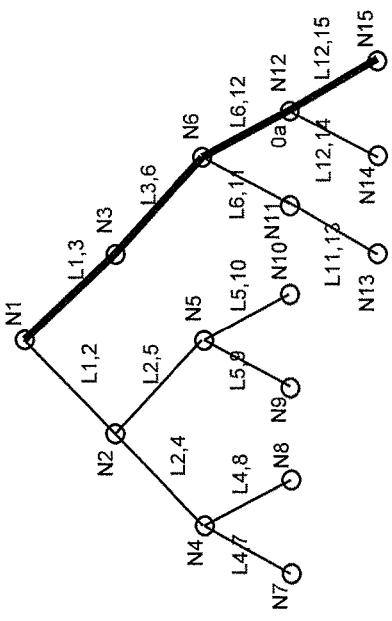
Fig. 6a
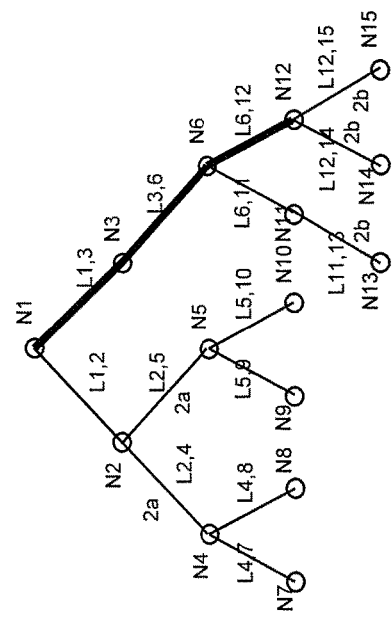
Fig. 5e
Fig. 5f

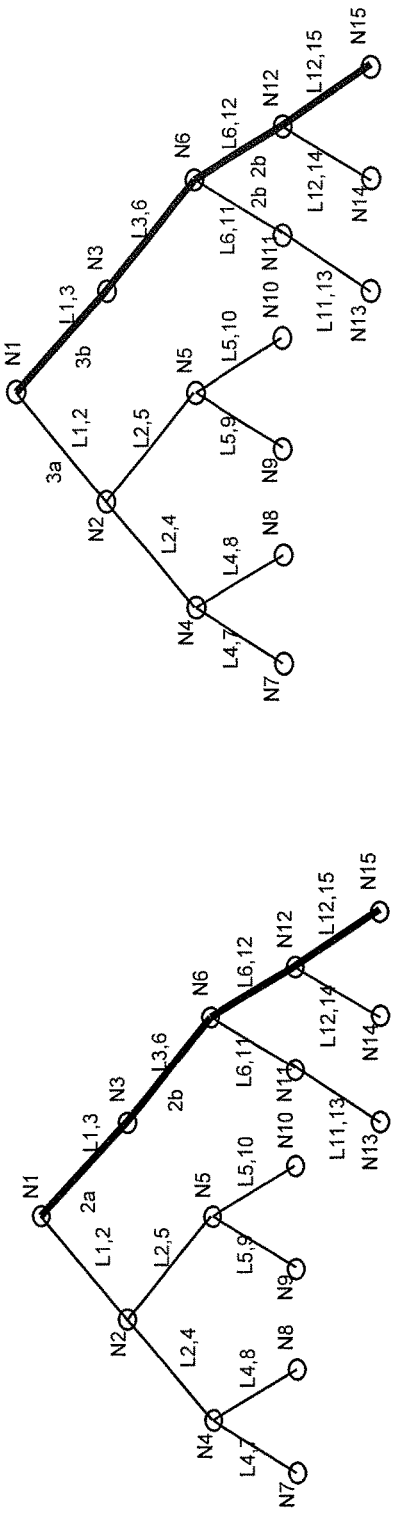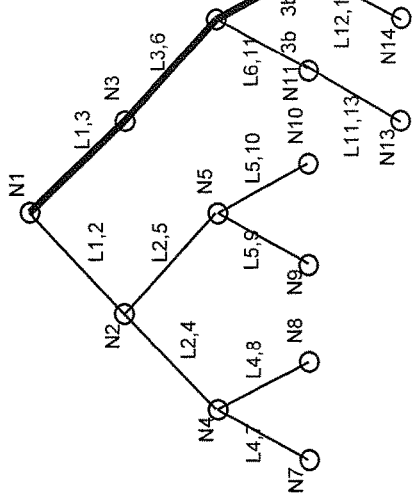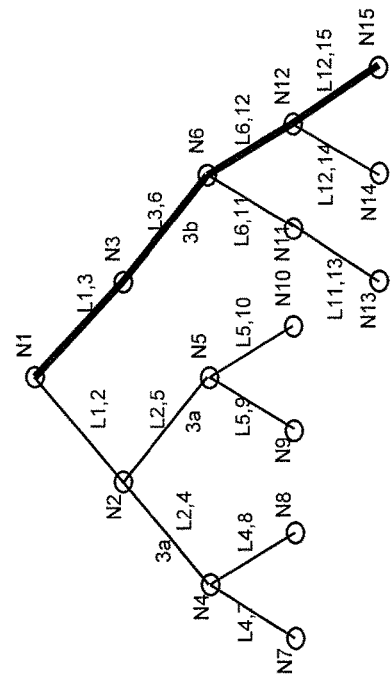
Fig. 6c  Fig. 6d  Fig. 6e  Fig. 6f

US 10,645,686 B2

RESOURCE RESERVATION PROTOCOL FOR WIRELESS BACKHAUL

TECHNICAL FIELD

The present disclosure generally relates to the field of resource reservation. More specifically, the present disclosure relates to a technique of reserving communication resources in a wireless communication network.

BACKGROUND

In mobile communications, there is an increasing demand for higher system capacity and end-user data rates. Data rates of the order of 10 Gigabits per second (Gbps) can be practically achieved only with a sufficiently large transmission bandwidth, significantly larger than the current maximum of 100 Megahertz (MHz) for the Long Term Evolution (LTE) standard. Such demands for very high system capacity and very high end-user date rates can be met by so-called Ultra-Dense Networks (UDNs). UDNs may be regarded as networks with access-node densities considerably higher than the densest cellular networks of today. UDNs may be set up with distances between access nodes from a few meters (m) in indoor deployments up to around 50 m in outdoor deployment.

UDNs may be expected to use a maximum transmission bandwidth of up to around 1 to 2 Gigahertz (GHz). Such very wide transmission bandwidths are realistically only possible at higher frequency bands beyond 10 GHz. For example, frequencies in the lower part of the millimeter wave band (mmW) up to 100 GHz may be of specific interest for UDNs. For this purpose, communication systems are densified more and more by providing a higher number of access nodes with smaller distances (measured from one access node to another access node) as compared with common communication systems. A network operating at mmW frequencies may require a dense mesh of network nodes given propagation conditions (high path loss) at such high frequencies. In such dense environments, it is not always possible to provide a wired backhaul to each access node. Thus, a solution where access nodes can be wirelessly backhauled by other access nodes becomes an attractive complement.

In the UDN context wireless self-backhaul for a set of UDN nodes and interference aware routing solutions for routing packets through the backhaul networks have been proposed by D. Hui and J. Axnäs in the paper "Joint Routing and Resource Allocation for Wireless Self-Backhaul in an Indoor Ultra-Dense Network", PIMRC 2013. With self-backhauling, an access node serves not only its own assigned User Equipments (UEs) in the vicinity but also its neighboring access nodes as a relaying node in order to route data towards and/or from an information aggregation node. To maximize the throughput of each route, a route selection process takes into account the mutual interference among wireless links. According to the concept of the aforementioned paper, one approach is to jointly optimize route selection and radio resource allocation. For this purpose, the original network may be transformed to an expanded virtual network in which each virtual node represents a possible way of allocating radio resources to the access node. A route selected in such a virtual network jointly determines a sequence of access nodes (i.e. the real route) and the corresponding radio resources allocated to the links associated with these nodes.

This and similar concepts provide a solution focusing on interference aware routing under full buffer assumptions.

A route is then the end-to-end path from an aggregation node (access node with wired backhaul) to the desired destination node, e.g. a User Equipment (UE). The individual hops in this end-to-end path are denoted links.

The routing—i.e., the process of finding a route or path from a source node to the destination node—is done often together with a (crude) resource allocation since interference between wireless links makes routing and resource allocation a dependent problem. Routing is a rather slow process since channel state information from throughout the network needs to be available for making routing decisions. Therefore also the resource allocation to links performed during routing is slow. The long-term assignment of resources to (a group of) link(s) may include at least dedicated (which can be referred to as green resources), prohibited resources (which can be referred to as red resources), and shared resources (which can be referred to as yellow resources). Dedicated resources can always be used by a link as there is no danger of interfering severely with other links. Prohibited resources are not allowed to be used by a link. Shared resources may interfere with other links and measures need to be taken to mitigate potentially high interference.

As stated above, the assignment of resources during routing is slow. The resources actually used for a transmission is determined by the Medium Access Control (MAC) layer. This is the fast resource allocation process. If a link has sufficient dedicated resources assigned to it these resources will be used first. If the dedicated resources do not suffice then also shared resources will be used. Since shared resources are not guaranteed to avoid heavy interference with transmissions on other links the usage of shared resources must be disseminated throughout the network to inform other nodes that these shared resources are used and other nodes potentially sustain from using them.

In unpublished patent application PCT/EP2014/051131 of the applicant flooding is described as a solution of how to disseminate resource information throughout the network. Flooding may be summarized shortly as follows. Flooding uses the already established links in the network. First, a node (the source) transmits a resource reservation (a resource reservation may be understood as a wish for a resource allocation, which may fail or not) by flooding to all other nodes in the network. Then, other nodes may refrain from transmitting in resources that they know would interfere with the claimed resource. If it is not interfering the resource may be spatially reused by other links.

Typically it is not sufficient to reserve resources for a single link only. Typically, resources will be needed on multiple links of the route. With the current solution one resource reservation process having the same resource reservation message(s) flooded throughout the network is needed for each link.

SUMMARY

Accordingly, there is a need for a technique for resource reservation which has low signaling overhead.

According to a first aspect, a method of reserving communication resources in a wireless communication network is provided. The wireless communication network comprises a plurality of nodes. Each of the plurality of nodes is connected to one or more of the plurality of nodes via one or more links. The method comprises receiving, by a node of the plurality of nodes, a resource reservation message. The resource reservation message includes first reservation information. The first reservation information indicates one or more communication resources for at least one link of the wireless communication network. The method further comprises modifying, by the node, the received resource reservation message by including second reservation information in the received resource reservation message. The second reservation information indicates one or more communication resources for a link of the node. In this respect, the link may be different from the link as indicated by the first resource reservation information. The method further comprises transmitting, by the node, the modified resource reservation message to one or more neighbor nodes of the node. A neighbor node of a node may correspond to a node which may be in a direct communication with the concerned node, i.e., without any intermediate further node.

Instead of creating a new resource reservation message including the second reservation information, the node includes the second reservation information in the already established and received resource reservation message including the first reservation information. In this way, the number of resource reservation messages transmitted between the nodes of the wireless communication network is reduced.

The modifying of the received resource reservation message by including second reservation information in the received resource reservation message may comprise adding the second reservation information to the received resource reservation message. Adding the second reservation information to the received resource reservation message may be regarded as appending the second reservation information to the received resource reservation message.

The node may comprise or may be configured as an access node, an eNodeB, a base station, a mobile terminal, or a relay node. In this respect, the plurality of nodes may comprise one or more access nodes, one or more eNodeBs, one or more base stations, one or more mobile terminals and/or one or more relay node. For example, a node may be configured as or comprise a base station such as an eNodeB in terms of LTE, a mobile terminal such as a User Equipment (UE), a wireless access point (WAP), a station (STA) in the sense of the 802.11 standard family or the like. The plurality of nodes may comprise one or more aggregation nodes. An aggregation node may be regarded as a node forming the connection to or entry point of the core network of the wireless communication network. An aggregation node may be regarded as a standard access node (set up to serve end users) with a wired backhaul connection. For example, the aggregation node may be an eNodeB or similar base station.

Each of the plurality of nodes may be connected to one or more of the plurality of nodes via one or more links to provide a plurality of routes for routing data through the wireless communication network. A route may be regarded as a path in the communication network from a source (access) node (e.g., an aggregation point of a backhaul network such as an aggregation node) to a destination (access) node (e.g., an aggregation point of a backhaul network such as an aggregation node). Each route may be formed by one or more links connecting the source (access) node and the destination (access) node via one or more intermediate (access) nodes.

The one or more links may be referred to as wireless links, respectively. The wireless communication network may comprise or may be configured as an Ultra Dense Network (UDN). A UDN may be regarded as a network with access-node densities considerably higher than the densest cellular networks of today. Such UDNs may be set up with distances between access nodes from a few meters in indoor deployments up to around 50 m in outdoor deployment.

The communication resources may be, or comprise, shared communication resources. For example, the first reservation information may indicate one or more shared communication resources to be shared by at least one link of the wireless communication network with one or more other links of the wireless communication network. The second reservation information may indicate one or more shared communication resources to be shared by a link of the node with one or more other links of the wireless communication network.

The step of transmitting may comprise transmitting, by the node, the modified resource reservation message to all neighbor nodes of the node except that node of the plurality of nodes from which the resource reservation message has been received. That node of the plurality of nodes from which the resource reservation message has been received is the transmitter of the first reservation information and is thus already aware of the first reservation information. As a consequence, the first reservation information does not have to be transmitted from the node receiving the resource reservation message including the first reservation information to that node from which the resource reservation message has been received. In this way, the number of resource reservation messages transmitted between the nodes of the wireless communication network may be reduced even further.

The direction from the node that is the transmitter of the resource reservation message towards the destination node of the route, e.g., towards the aggregation node, may be understood as an upstream direction. In this context, the opposite direction may be understood as a downstream direction.

The method may comprise transmitting, by the node, the second reservation information to that node of the plurality of nodes from which the resource reservation message has been received. The aforementioned transmission may only include the second reservation information. In other words, the only reservation information included in this transmission may be the second reservation information. By transmitting the second reservation information rather than the first reservation information to that node of the plurality of nodes from which the resource reservation message has been received, the signaling overhead may be reduced even further.

The method may comprise generating, by the node, an informing resource reservation message including the second reservation information. The method may further comprise transmitting, by the node, the informing resource reservation message to that node of the plurality of nodes from which the resource reservation message has been received. The informing resource reservation message may only include the second reservation information rather than any further reservation information. By including only the second reservation information rather than the first reservation information into the informing resource reservation message (transmitted to that node of the plurality of nodes from which the resource reservation message has been received), the signaling overhead may be reduced even further.

The method may comprise modifying, by the node, the received resource reservation message, if the node reserves one or more communication resources for a link of the node. For example, the node may only modify the received resource reservation message by including, e.g. adding or appending, the second reservation information, if the node actually performs reservation of one or more communication resources for the link. In this way, the received resource reservation message may only be extended by the included, e.g. added or appended, second reservation information, if the node actually performs reservation. As a consequence, the overhead may be reduced even further.

The method may comprise determining, by the node, whether the link of the node and the at least one link of the wireless communication network as indicated by the first reservation information are on a same route from a source node to a destination node of the wireless communication network. The method may comprise modifying, by the node, the resource reservation message, if the link of the node and the at least one link of the wireless communication network as indicated by the first reservation information are on a same route from a source node to a destination node of the wireless communication network. For example, the node may only modify the received resource reservation message by including, e.g. adding or appending, the second reservation information, if the link of the node and the at least one link of the wireless communication network as indicated by the first reservation information are on the same route from the source node to the destination node of the wireless communication network. In this way, the received resource reservation message may only be extended by the included, e.g. added or appended, second reservation information, if the node is on a route relating to the route of the received resource reservation message. As a consequence, the overhead may be reduced even further.

The method may comprise forwarding, by the node, the received resource reservation message to one or more neighbor nodes of the node, if the node does not reserve (i.e., does not perform reservation of) the one or more communication resources for a link of the node. For example, the received resource reservation message is not extended by the second reservation information, but forwarded as it is received. As a consequence, the overhead may be reduced even further. The method may comprise forwarding, by the node, the received resource reservation message to one or more neighbor nodes of the node, if the link of the node and the at least one link of the wireless communication network as indicated by the first reservation information are not on a same route from a source node to a destination node of the wireless communication network. In this way, the received resource reservation message is, for example, not extended by the second reservation information but forwarded as it is received, if the node is not on the route relating to the route of the received resource reservation message. As a consequence, the overhead may be reduced even further.

The method may comprise receiving, by the node, an informing resource reservation message including third reservation information indicating one or more communication resources for one or more other links of the wireless communication network. The method may further comprise forwarding, by the node, the informing resource reservation message to one or more neighbor nodes of the node. For example, the method may further comprise forwarding, by the node, the informing resource reservation message to one or more downstream neighbor nodes of the node.

The resource reservation message may include information about a destination node of the resource reservation message. Alternatively or additionally, the resource reservation message may include information about a route from a source node to a destination node of the wireless communication network. By including the destination node of the resource reservation message and/or information about the route, the node may determine whether a link of the node and the at least one link of the wireless communication network as indicated by the first reservation information are on the same route from a source node to a destination node of the wireless communication network.

The second reservation information may include information indicating a starting time of a reservation of the one or more communication resources indicated by the second reservation information. Alternatively or additionally, the second reservation information may include information indicating an end time of the reservation of the one or more communication resources indicated by the second reservation information. Alternatively or additionally, the second reservation information may include information indicating a duration of the reservation of the one or more communication resources indicated by the second reservation information. Alternatively or additionally, the second reservation information may include information indicating a priority of the reservation of the one or more communication resources indicated by the second reservation information. Alternatively or additionally, the second reservation information may include information indicating at least one of the plurality of nodes which is intended to be receiver of a transmission using the one or more communication resources indicated by the second reservation information. Alternatively or additionally, the second reservation information may include information indicating at least one of the plurality of nodes which is intended to be transmitter of a transmission using the one or more communication resources indicated by the second reservation information.

The node may be a scheduling node. Scheduling may be understood such that a node schedules one or more nodes, e.g., neighbor nodes, in downstream direction.

In this case, the step of transmitting may comprise transmitting, by the node, the modified resource reservation message to one or more neighbor nodes of the node except that node of the plurality of nodes from which the resource reservation message has been received and except at least one node, for example all nodes, of the plurality of nodes which is under scheduling control of the node. If the node receives an informing resource reservation message including third reservation information indicating one or more communication resources for one or more other links of the wireless communication network, the method may comprise forwarding, by the node, the informing resource reservation message to one or more neighbor nodes of the node except at least one node, for example all nodes, of the plurality of nodes which is under scheduling control of the node.

The method may comprise increasing a neighbor node counter after performing any of the transmitting and/or forwarding steps mentioned herein. In this respect, a neighbor counter may relate to a counter used to count neighbor nodes sequentially one by one. A value of the neighbor node counter may be increased, e.g., by one, when a different node may be considered compared to a previous considered node. By means of the neighbor node counter the node may determine, for each of its neighbor nodes, whether and which information is to be transmitted to the respective neighbor node.

According to a second aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a third aspect, a node for reserving communication resources in a wireless communication network is provided. The wireless communication network comprises a plurality of nodes. Each of the plurality of nodes is connected to one or more of the plurality of nodes via one or more links. The node comprises a receiving component, a modifying component and a transmitting component. The receiving component is configured to receive a resource reservation message. The resource reservation message includes first reservation information. The first reservation information indicates one or more communication resources for at least one link of the wireless communication network. The modifying component is configured to modify the received resource reservation message by including second reservation information in the received resource reservation message. The second reservation information indicates one or more communication resources for a link of the node. The transmitting component is configured to transmit the modified resource reservation message to one or more neighbor nodes of the node.

For example, the modifying component may be configured to modify the received resource reservation message by adding the second reservation information to the received resource reservation message.

The node according to the third aspect may be configured to perform any of the method steps described herein. The node according to the third aspect may comprise or be configured as an access node, an eNodeB, a base station, a mobile terminal or a relay node.

According to a fourth aspect, a node for supporting reservation of communication resources in a wireless communication network is provided. The wireless communication network comprises a plurality of nodes. Each of the plurality of nodes is connected to one or more of the plurality of nodes via one or more links. The node comprises a receiving component and a forwarding component. The receiving component is configured to receive a resource reservation message. The resource reservation message includes first reservation information. The first reservation information indicates one or more communication resources for a link of the wireless communication network. The forwarding component is configured to forward the received resource reservation message to one or more neighbor nodes of the node, if the node does not reserve (i.e. does not perform reservation of) the one or more communication resources for a link of the node (i.e., if the node does not reserve the one or more communication resources for the link of the node).

The node according to the fourth aspect may be configured to perform any of the method steps described herein. The node according to the fourth aspect may comprise or be configured as an access node, an eNodeB, a base station, a mobile terminal or a relay station.

According to a fifth aspect, a communication system for reserving communication resources in a wireless communication network is provided. The wireless communication network comprises a plurality of nodes. Each of the plurality of nodes is connected to one or more of the plurality of nodes via one or more links. The plurality of the nodes may comprise at least one node according to the third aspect and/or at least one node according to the fourth aspect. The system may be configured to perform the steps of any one of the method aspects as described herein.

In general, the steps of any one of the method aspects described herein may equally be embodied in one or more suitable components, devices or units, e.g. in suitable components of the node(s) and/or the communication system.

BRIEF DESCRIPTION OF THE DRAWINGS

In the following, the present disclosure will further be described with reference to exemplary embodiments illustrated in the figures, in which:

FIG. 3a is a schematic illustration of a node according to a first embodiment;

FIG. 3b is a schematic illustration of a node according to a second embodiment;

FIG. 4a is a flowchart illustrating a method embodiment performed in the node of FIG. 3a;

FIG. 4b is a flowchart illustrating a method embodiment performed in the node of FIG. 3b;

FIGS. 5a to 5f schematically illustrates a tree-structured UDN comprising one or more nodes according to FIG. 3a and/or FIG. 3b;

FIGS. 6a to 6g schematically illustrates a tree-structured UDN comprising one or more nodes according to FIG. 3a and/or FIG. 3b in case of scheduling;

DETAILED DESCRIPTION

Figure 1:
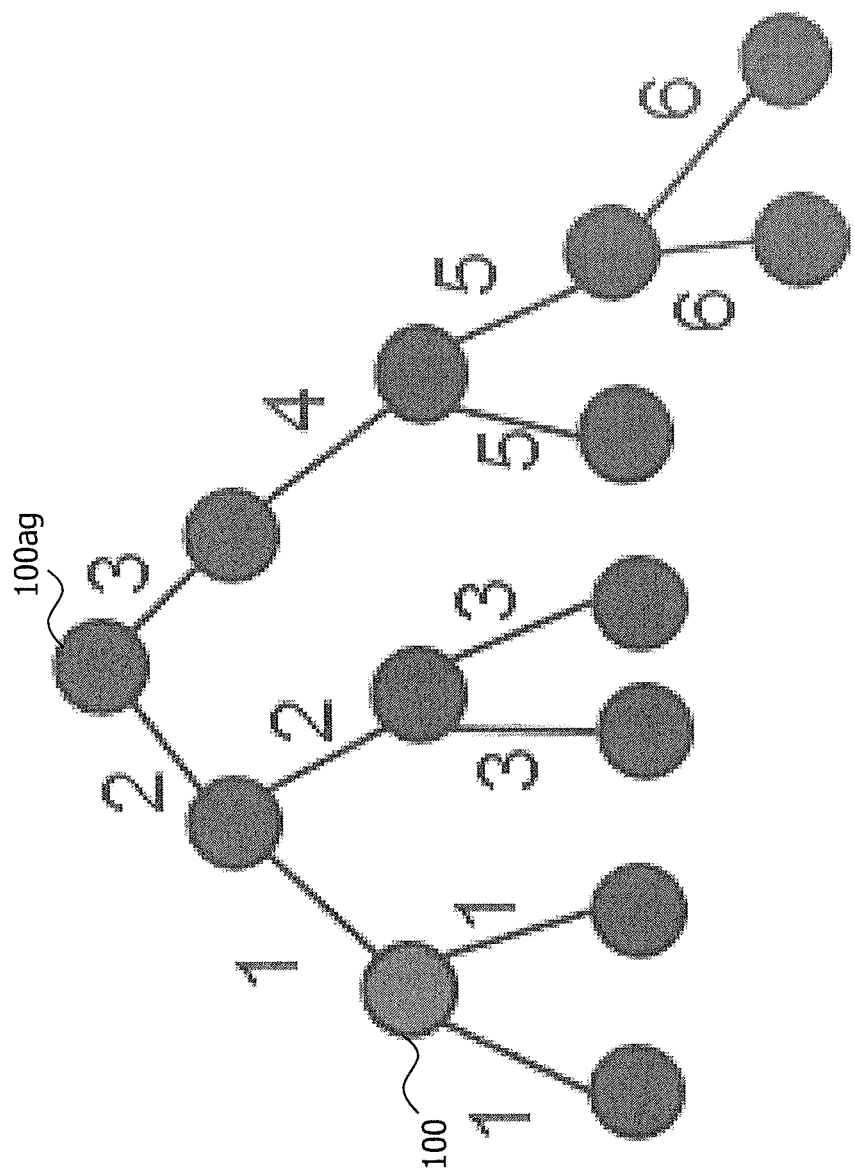
FIG. 1 schematically illustrates collision-free flooding of a resource reservation message in a tree-structured UDN.

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is described with reference to Ultra-Dense Networks (UDNs), the present disclosure may be practiced in any network to which mobile or stationary users may attach. Further, although it is sometimes referred to below only to the reservation of shared resources, the general concepts described below may equally be applicable to the reservation of other communication resources. Still further, the skilled person will appreciate that the present disclosure may be practiced with network topologies different from the specific tree structure discussed below to illustrate the present disclosure. Such a network topology might be free of any hierarchy, such as in a mesh network. Also, for example, the present disclosure is applicable to cellular networks such as Global System for Mobile Communications (GSM), Universal Mobile Telecommunications System (UMTS), Long Term Evolution (LTE), LTE-Advanced (LTE-A) networks, or to Wireless Local Area Network (WLAN) or similar wireless networks, but also to wireline networks such as, for example, the Intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to cause the processor to perform the methods disclosed herein when executed by the processor.

Before the present disclosure is described in detail, some specifics regarding the concept of resource reservation, shared resources and flooding are explained below.

Normally, a wireless communication network comprises a plurality of nodes. Each of the plurality of nodes is connected to one or more other nodes of the plurality of nodes via one or more links to provide a plurality of routes for routing data through the wireless communication network. A node may receive, for its links, allocation information. The allocation information may be received from a interference aware routing (IAR) functionality or a spectrum sharing functionality or from a layer which is higher in the Open Systems Interconnection Model (OSI) model than a Medium Access Control (MAC) layer. As the MAC layer is arranged in layer 2 of the OSI model such higher layer may, for example, be layer 3 or layer 4. The allocation information indicates one or more communication resources of available communication resources. The allocation information may generally indicate how available communication resources are to be allocated. The allocation information may comprise information indicating at least one of: which of the available communication resources is to be allocated to one or more routes, which of the available communication resources is to be not allocated to one or more routes, and which of the available communication resources is prohibited from being allocated to one or more routes. For one or more links of the plurality of nodes, one or more of the available communication resources may be shared communication resources. For example, the one or more shared communication resources are to be shared by a link of the node with one or more other links of the wireless communication network, e.g., another, different link of the node or one or more links of other nodes of the plurality of nodes, as indicated by the allocation information or by allocation information that has been adjusted by the MAC layer, for example.

An exemplary allocation of communication resources may be as follows. The communication resources may comprise different kinds of resources which are referred to in the following as green resources, yellow resources and red resources, respectively, in order to visualize a usage functionality thereof, seen from a perspective of one node or one communication link. The green resources are the available communication resources which are to be allocated to one or more of the plurality of routes. The yellow resources are the available communication resources which are to be shared with other links. The red resources are the available communication resources which are prohibited from being allocated to one or more of the plurality of routes. In some situations there may be non-allocated resources as well, which are not prohibited. The yellow resources are shared (communication) resources that may be used for reducing the risk of buffer overflow and increase the throughput locally. The reason for using yellow resources may be that the link is in a fading dip and may not support the offered traffic using the green resources alone.

The reservation of such shared yellow resources for usage by one or more links will now be explained with respect to FIGS. 1 and 2. More precisely, a method for accessing shared (yellow) communication resources, e.g., atomic scheduling units (ASUs—i.e., the smallest unit of a communication resource), without interfering with other concurrent transmissions in a UDN will be described. A flooding technique may be used for distributing the reservation information. A flooding algorithm is an algorithm for distributing data, e.g., data packets, to every part of a graph of a network. The name derives from the concept of inundation by a flood.

The overall idea with flooding of reservation information is that the node that wants to access the shared (yellow) communication resource, e.g., yellow ASU, lets the rest of the nodes in the UDN know that a shared communication resource will be used. For example, node 100 of FIG. 1 may inform the rest of the nodes in the UDN which resource will be used, where and when by transmission of a resource reservation message. The resource reservation message is sent using a flooding technique through the UDN which ensures that all other ANs are aware of the communication resource reservation, e.g., the ASU reservation. The flooding uses the already established links in the UDN and the messages may be piggy-backed on the data packets that are sent along the links. The flooding messages (resource reservation messages) are typically lightweight and from this perspective the links have virtually extraordinary capacity.

In FIG. 1, the node 100 in the illustration is the source initiating the flooding, which is called source node 100 in the following. Further, there is an aggregation node (AgN) 100*ag*.

At first, the source node 100 transmits a resource reservation message comprising a resource reservation by flooding to all other nodes in the UDN. In FIG. 1, the numbers at the links do not relate to routes but to the time that has passed (e.g. the number of frames) until the resource reservation message (after transmission by the source AN 100) is transmitted over the respective link when using the flooding technique. As none of the other nodes sent out a resource reservation message in FIG. 1, FIG. 1 shows a collision free realization of the flooding of a resource reservation message through a UDN. After six frames all nodes have been reached by the resource reservation message and the resource is safe to be used by the source node 100 for the reservation duration. After having received the resource reservation message sent out by the node 100, other nodes than the node 100 may refrain from transmitting in resources that they know would interfere with the claimed resource (as claimed in the resource reservation message). If it is not interfering, the resource may be spatially reused by other links.

This interference estimation is possible since all nodes are assumed to have the complete gain matrix (G-matrix) available. For example, the gain matrix has been estimated for the IAR operation. As such each node may estimate if transmissions along the various links from the nodes will interfere with the reception by the node indicated in the resource reservation message. This may be done by comparing the estimated interference to a threshold that may be adjusted to account for e.g., the fading conditions or the number of nodes in the UDN (to account for aggregate interference due to spatial reuse). If the estimated interference is below the threshold, the resource stays yellow and may be used by the link. If the estimated interference is above the threshold, the resource is not usable.

The starting time of using the reservation as indicated in the resource reservation message may not be before the time for flooding in the UDN, i.e., the number of frames until the resource reservation message has been received by all nodes in the UDN, has passed. The starting time of using the reservation may be at least the present time plus the time needed for flooding (in short, time for flooding). The starting time of using the reservation may be regarded as the earliest time that the allocation can be ensured to have been announced to everyone. This delay (compared to starting to use the ASU immediately at the present time) is included to avoid collisions in the resource. The time for flooding is given as the time it takes to reach every other node in the UDN from a given node. In the specific exemplary case of a tree-structured UDN illustrated in FIG. 1, the flooding time from node 100 is 6.

Figure 2:
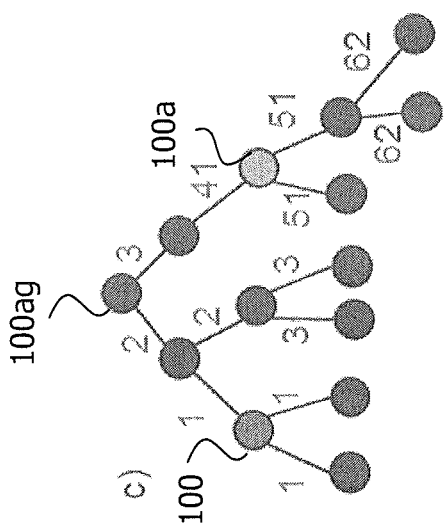
FIG. 2 schematically illustrates flooding with a collision of resource reservation messages in the tree-structured UDN of FIG. 1.
Figure 2:
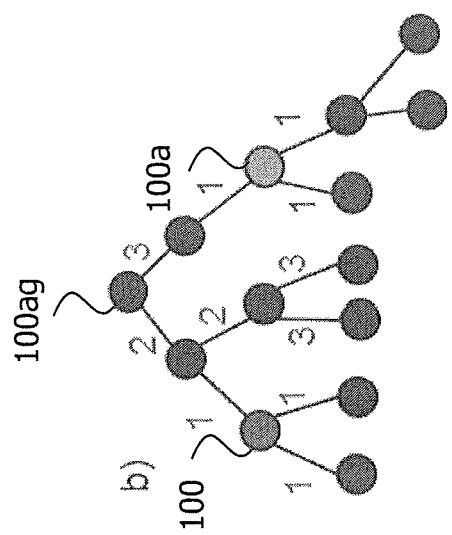
Figure 2:
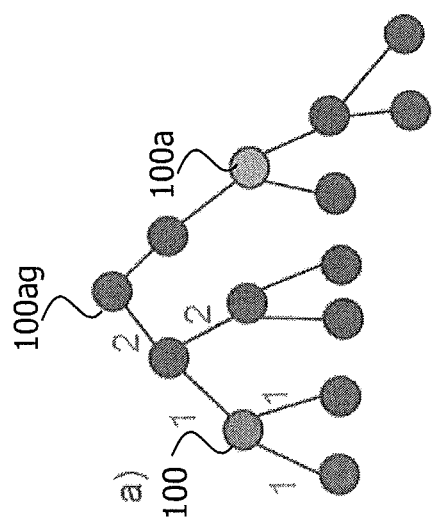

In order to better understand the flooding procedure described with respect to FIG. 2, it may be worth mentioning that the resource reservation message may comprise at least one of information indicating information indicating at least one of the plurality of nodes which is intended to be receiver of a transmission using the one or more communication resources indicated by the second reservation information, and information indicating at least one of the plurality of nodes which is intended to be transmitter of a transmission using the one or more communication resources indicated by the second reservation information. The aforementioned information may be used in the flooding procedure of FIG. 2 to determine whether reservations are compatible or not. Further, the resource reservation message may comprise a priority of the reservation of the one or more communication resources. In case of incompatible resources, the priority may be used to make a priority decision as explained in more detail below. Further details may be derived from unpublished patent application PCT/EP2014/051131 of the applicant.

An illustration of the flooding procedure when two nodes try to reserve the same resource roughly at the same time is given in FIG. 2. Thus, in FIG. 2, a reservation collision resolution is schematically depicted. Such a situation may occur when two or more nodes such as node 100 and node 100a want to reserve the same resource within the flooding time of the first flooded message (either the resource reservation message transmitted from node 100 or the resource reservation message transmitted from node 100a). Before describing the sequence of events in FIG. 2, a definition of what is to be understood as a compatible reservation is given.

Two resource reservations of the same communication resource, e.g., ASU, for different links are said to be compatible if the transmissions, if they were to occur, would not significantly interfere the non-intended receiver. This assessment may be done at any node by using the complete gain matrix (G-matrix) which may be available due to the IAR operation. The nodes may thus compute whether the allocations would—if they were to be used at the same time by the two links—cause significant interference to the receiver of the other link. If none of the receivers are estimated to be interfered (above a threshold) the reservations are said to be compatible. The calculation is done in the same manner as when a resource is assessed for being turned to be allocated red or not, as described above. More precisely, an estimation of the path gain between the concerned nodes is considered (i.e., the intended transmitter node (as indicated in the second resource reservation message) and the receiver node in the previous reservation (i.e., the first resource reservation message)). With this estimation it is determined whether the transmission indicated in the second resource reservation message interferes with the reception of the transmission indicated in the first resource reservation message. If the estimation and thus the determination is in the affirmative, then the reservations are not compatible. If the determination results in "no", the reservations are compatible.

Returning to FIG. 2, the node 100 sends a resource reservation message. Likewise, the node 100a sends a resource reservation message. It is exemplarily assumed that both resource reservation messages have same priority and start timing. Node 100a receives the resource reservation message of the node 100 and vice versa. If the two reservations are compatible, everything is fine. The reservations can be used by the node 100 and the node 100a, respectively. If they are not compatible, one (and only one) node, either the node 100 or the node 100a, has to give up. If both nodes 100, 100a would give up, the resource would be wasted, since nobody uses it.

The decision which node is to give up may be based on a receiving node identity (node 100 knows its own destination and the destination of node 100a from the RCR message and vice versa). In one embodiment, a lower destination node identity is given the priority, i.e., "wins". A node identity number may be assigned so that nodes closer to the AgN 100ag (i.e., closer to the wired backhaul) have lower numbers (i.e. higher priority) than ANs that are more hops away from the AgN 100ag. This scheme prioritizes traffic that is sent close to the AgN 100ag. This is beneficial since capacity bottlenecks are more likely to appear close to the AgN 100ag than further away from the AgN 100ag with a distance being measured in number of hops. The decision could also be made at an intermediate node, which is just forwarding resource reservation message(s). The resource reservation message of the losing node is not forwarded.

Referring to FIG. 2 again, the illustrated sequence of events is as follows:

At first, at time 0, node 100 starts flooding (sending out an resource reservation message by flooding) for a reservation starting at time t=7, i.e., the frame directly after the time for flooding in the UDN has passed. As explained above with respect to FIG. 1, the time for flooding for node 100 is 6 in the present example. As the communication resource is not allowed to be used until the flooding is finished, the reservation for usage is to be started at time t=1+6=7 at the earliest.

At time 2, the node 100a plans to reserve the same communication resource starting at t=3+5=8 (see part b) of FIG. 2). The time for flooding for node 100a is 5 in the present example and the flooding is initialized at time 2. In order to determine the time for flooding, the number of hops from the node 100a to a node in the UDN can be counted, which is the furthest to the node 100a (i.e., count the number of hops from the node 100a to a node which is the most hops away from node 100a). Hence communication (use of the reserved resource) may start the frame after that. When two messages for overlapping allocations are received at a node, the node evaluates whether or not the reservations are compatible. If the reservations are compatible, both flooding messages are forwarded. If the reservations are not compatible, only the message with the lowest start time is forwarded.

According to a first variant, when the node 100a receives the resource reservation message of node 100, the node 100a, for example, deems the reservations not to be compatible. In FIG. 2 it is assumed by way of example that, if the resource reservation messages are not compatible, the resource reservation message of node 100a will not be forwarded through the UDN as it has been started at a later point of time. Thus, node 100a backs off. Node 100a may possibly start flooding a resource reservation message for resource reservation starting at t=6+<reservation duration of node 100>. In other words, the node 100a has to wait until the reservation of node 100 is over plus the time offset 6 (because the time duration of the flooding is 5). This new message will be flooded immediately since the reservation is compatible (does not collide time-wise) with the reservation of node 100.

According to a second variant (not shown in FIG. 2), if the reservations are not compatible, a priority decision may be made. For example, node 100a has higher priority than as indicated by the resource reservation message of node 100. For example, the resource reservation message of node 100a may contain priority information which is higher than the priority information contained in the resource reservation message of node 100. This higher priority information causes the flooding messages of node 100 to stop being flooded and the node 100 to back off.

According to a third variant (not shown in FIG. 2), root-near nodes (i.e., nodes at a low hop count distance from the AgN 100ag) will have an advantage over deeper nodes. This may be beneficial as root-near nodes typically carry more traffic.

With respect to FIGS. 1 and 2 an approach is described where resource reservation messages are disseminated in a network via flooding. One resource reservation message is generated for each link of the route from source node to destination node and each of these resource reservation messages is flooded through the network. Typically it is not sufficient to reserve communication resources such as shared resources for a single link only. Typically communication resources such as shared resources will be needed on multiple links of the route. With the current approach as described with respect to FIGS. 1 and 2 one resource reservation process (having the same resource reservation messages flooded throughout the network) is needed for each link. This results in a large number of resource reservation messages and copies thereof. The overhead is quite high.

In the following, the approach described above with respect to FIGS. 1 and 2 is extended by adding resource reservations for other links of the same route into the resource reservation message and by that reducing the number of resource reservation messages. The overhead decreases. The number of resource reservation messages and thus the overhead needed to reserve communication resources such as shared resources on multiple links of a route is reduced compared to the approach of FIGS. 1 and 2.

FIG. 3a shows a node 100 according to a first device embodiment. The node is adapted for reserving communication resources in a wireless communication network such as a UDN. The wireless communication network comprises a plurality of nodes. Each of the plurality of nodes is connected to one or more of the plurality of nodes via one or more links. The node 100 comprises a receiving component 120, a modifying component 160 and a transmitting component 140. The node 100 will be further described below with respect to FIG. 4a.

FIG. 3b shows a node 200 according to a second device embodiment. The node is adapted for supporting reservation of communication resources in a wireless communication network such as a UDN. The wireless communication network comprises a plurality of nodes. Each of the plurality of nodes is connected to one or more of the plurality of nodes via one or more links. The node 200 comprises a receiving component 220 and a forwarding component 240. The node 200 will be further described below with respect to FIG. 4b. Although the node 200 and the node 100 are illustrated as separate embodiments, the components and functionalities of both nodes may very well be combined in one node. For example, the forwarding component 240 of node 200 may be implemented in the transmitting component 140 of node 100 and the receiving component 220 of node 200 may be implemented in the receiving component 120 of node 100.

Figures 4A, 4B:
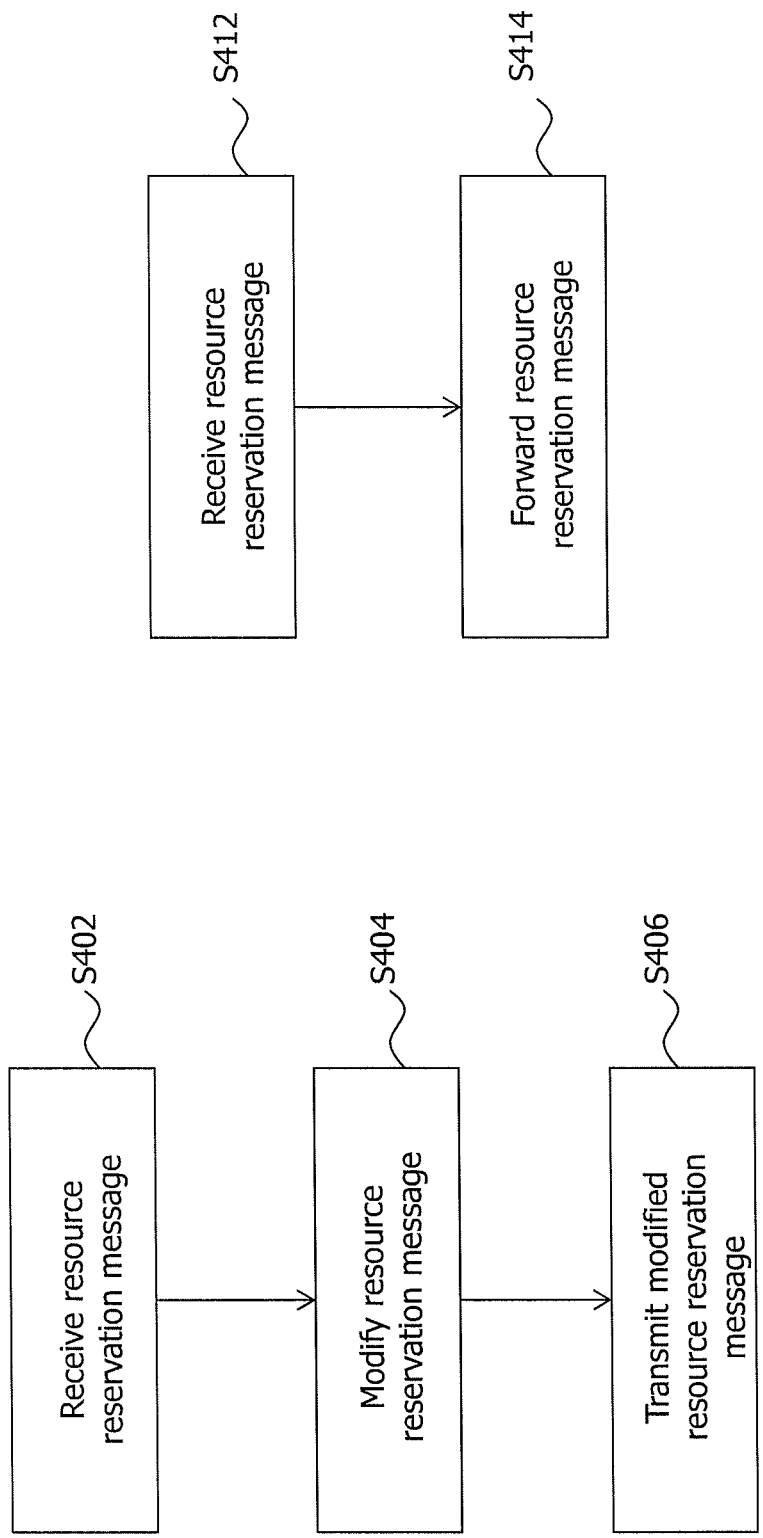

FIG. 4a shows a first method embodiment which can be implemented in the node 100 according to the first device embodiment of FIG. 3a. In step S402, the receiving component 120 receives a resource reservation message. The resource reservation message includes first reservation information. The first reservation information indicates one or more communication resources for at least one link of the wireless communication network. In step S404, the modifying component 160 modifies the received resource reservation message. The received resource reservation message may be modified by the modifying component 160 by including second reservation information in the received resource reservation message, e.g. by adding or appending second reservation information to the received resource reservation message. The second reservation information indicates one or more communication resources for a link of the node 100. In step S406, the transmitting component 140 transmits the modified resource reservation message to one or more neighbor nodes of the node 100.

FIG. 4b shows a second method embodiment which can be implemented in the node 200 according to the second device embodiment of FIG. 3b. In step S412, the receiving component 220 receives a resource reservation message. The resource reservation message includes first reservation information. The first reservation information indicates one or more communication resources for a link of the wireless communication network. In step S414, the forwarding component 240 forwards the received resource reservation message to one or more neighbor nodes of the node 200, if the node 200 does not reserve (i.e. does not perform reservation of) the one or more communication resources for a link of the node 200. Unlike node 100, node 200 does not modify the received resource reservation message.

Further details regarding the nodes 100, 200 and the method embodiments performed therein are described below with respect to FIGS. 5a to 5f and 6a to 6g. Even if in the below these details are be described with respect to a UDN having a tree structure, these details can also be realized if the UDN does not have a tree structure but another structure, e.g., if there are connection loops. This is because each concerned node is connected to the UDN and as such will be reached by a resource reservation message via perhaps a multitude of paths. Infinite loops of these messages may be avoided, for example, by not forwarding a message that has already been received by a node. As a consequence, the structure of the UDN is not restricted to a tree structure as exemplarily shown in FIGS. 5a to 5f and 6a to 6g.

The above concept will now be described in more detail with respect to FIGS. 5a to 5f. In the following example it is assumed for illustration rather than limitation that each node that is part of the route reserves shared resources. In the example of FIGS. 5a to 5f, the route starts at node N12 (start node) and ends at node N1 (destination node). This is visualized in FIGS. 5a to 5f by the links of the route indicated in bold.

Figure 5B:
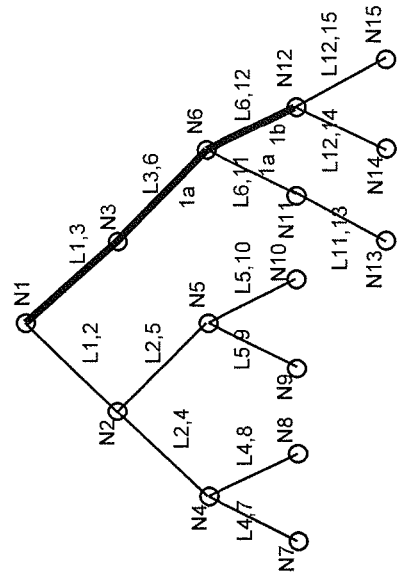
Figure 5D:
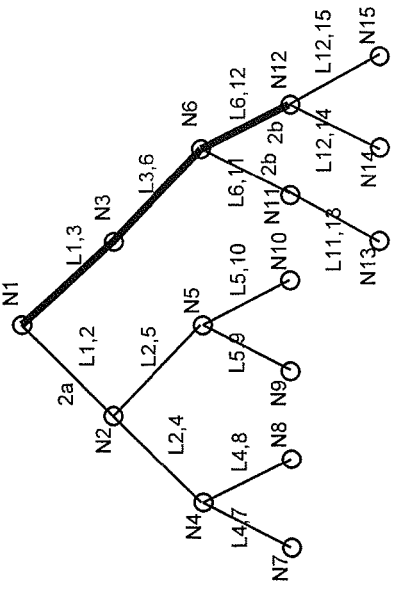
Figure 5A:
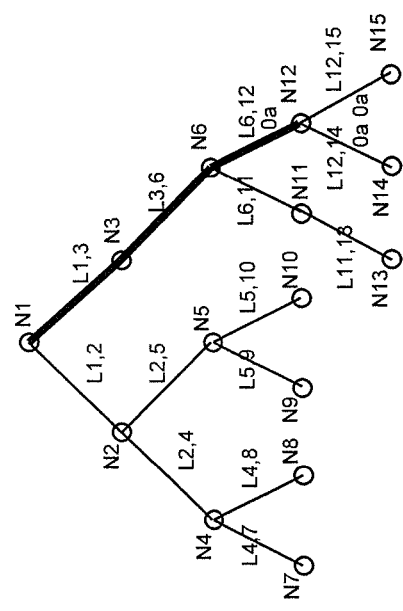

The process visualized in FIGS. 5a to 5f starts at starting time t=t0 shown in FIG. 5a. At time t=t0, node N12 sends a resource reservation message 0a to its neighbor nodes N6, N14, N15 to inform them about its resource reservation for a shared resource on link L6,12. The resource reservation message 0a may further include information about the starting time of the resource reservation on link L6,12 and/or the duration of the resource reservation on link L6,12. For example, the resource reservation message may include information that the resource reservation on link L6,12 may start at time t_TX_L6,12 for a duration Duration_L6,12. The destination node N1 may be included in the resource reservation message 0a as well.

The next step at time t=t0+T_Step is shown in FIG. 5b. T_Step relates to the time interval between t_0 and the now concerned time instance. As can be seen from FIG. 5b, node N6 is part of the route indicated in resource reservation message 0a. As node N6 is part of the route, it implements, at time t=t0+T_Step, functions described above with respect to node 100 according to the first device embodiment of FIG. 3a. Node N6 modifies the received resource reservation message 0a by adding the resource reservation for link L3,6 to message 0a. The modified resource reservation 1a is then sent by node N6 to neighbor nodes N3, N11 to inform them about the received resource reservation for shared resources on link L6,12 as indicated in the received resource reservation message 0a and to inform them about its own resource reservation for link L3,6. The modified resource reservation message 1a may further include information about the starting time of the resource reservation on link L3,6 and link L6,12 (starting time t_TX_L3,6 and t_TX_L6,12, respectively) and/or information about the duration of the resource reservation on link L3,6 and link L6,12 (duration Duration_L3,6 and Duration_L6,12, respectively). The destination node N1 may be included in the modified resource reservation message 1a as well. Node N6 also sends an informing resource reservation message 1b to neighbor node N12 from which it received the resource reservation message 0a. The informing resource reservation message 1b only contains information about the new resource reservation for link L3,6 (since N12 is the source of resource reservation message 0a it knows the reservations contained therein and does not need them again).

Figure 5C:
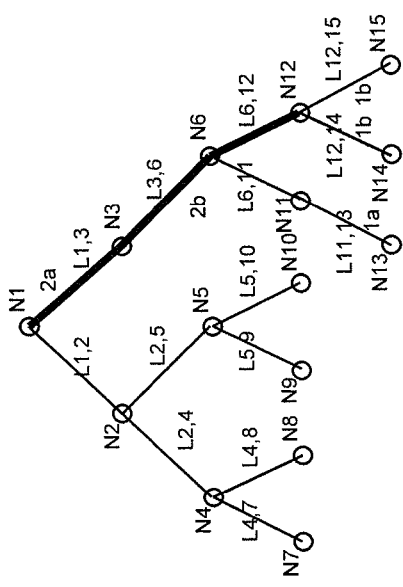

The next step at time t=t0+2T_Step is shown in FIG. 5c. As can be seen from FIG. 5c, node N3 is part of the route indicated in resource reservation message 1a. As node N3 is part of the route, it implements, at time t=t0+2T_Step, functions described above with respect to node 100 according to the first device embodiment of FIG. 3a. At time t=t0+2T_Step, node N3 modifies the received resource reservation message 1a by adding the resource reservation for link L1,3 to the received resource reservation message 1a. The modified resource reservation message 2a is sent by node N3 to neighbor node N1 to inform it about the received resource reservation for shared resources on links L6,12, L3,6 and its own reservation for link L1,3. The resource reservation message 2a may further include the starting time of the resource reservation on link L6,12, link L3,6 and link L1,3 (starting time t_TX_L6,12 and t_TX_L3,6 and t_TX_L1,3, respectively) and/or the duration of the resource reservation on link L6,12, link L3,6 and link L1,3 (duration Duration_L6,12 and Duration_L3,6 and Duration_L1,3, respectively). The destination node N1 may be included in the modified resource reservation message 2a as well. Node N3 also sends an informing resource reservation message 2b to neighbor node N6 from which it received the resource reservation message 1a. The informing resource reservation message 2b only contains the new resource reservation for link L1,3 (since N6 is the source of resource reservation message 1a it knows the reservations contained therein and does not need them again). As can be further seen from FIG. 5c, node N11 is not part of the route indicated in the received resource reservation message 1a. As node N11 is not part of the route, it implements, at time t=t0+2T_Step, functions described above with respect to node 200 according to the second device embodiment of FIG. 3b. Node N11 thus does not modify the received resource reservation message 1a and just forwards it to node N13. Node N12 does not modify the received informing resource reservation message 1b and just forwards it to nodes N14, N15.

The next step at time t=t0+3T_Step is shown in FIG. 5d. As can be seen from FIG. 5d, node N1 is part of the route indicated in resource reservation message 2a. As node N1 is part of the route, it implements, at time t=t0+3T_Step, functions described above with respect to node 100 according to the first device embodiment of FIG. 3a. However, as node N1 is the destination node, it does not have any resource reservations to add to the received resource reservation message 2a. Thus, the resource reservation message 2a remains unchanged by node N1. At time t=t0+3T_Step, node N1 sends the received resource reservation message 2a to neighbor node N2 to inform it about the received resource reservation for shared resources on links L6,12, L3,6, L1,3. The destination node N1 may be included in this message as well. Node N6 does not modify the received informing resource reservation message 2b and just forwards it to neighbor nodes N11, N12.

The next step at time t=t0+4T_Step is shown in FIG. 5e. As can be seen from FIG. 5e, node N2 is not part of the route indicated in resource reservation message 2a. As node N2 is not part of the route, it implements, at time t=t0+4T_Step, functions described above with respect to node 200 according to the second device embodiment of FIG. 3b. At time t=t0+4T_Step, node N2 does not modify the received resource reservation message 2a and just forwards it to nodes N4, N5. Further, node N11 does not modify the received informing resource reservation message 2b and just forwards it to node N13. Node N12 does not modify the received informing resource reservation message 2b and just forwards it to downstream neighbor nodes N14, N15.

The next step at time t=t0+5T_Step is shown in FIG. 5f. As can be seen from FIG. 5f, node N4 is not part of the route indicated in resource reservation message 2a. As node N4 is not part of the route, it implements, at time t=t0+5T_Step, functions described above with respect to node 200 according to the second device embodiment of FIG. 3b. Node N4 does thus not modify the received resource reservation message 2a and just forwards it to nodes N7, N8. Similarly, node N5 is not part of the route indicated in resource reservation message 2a. Node N5 does thus not modify the received resource reservation message 2a and just forwards it to nodes N9, N10. Each node which has no further neighbor node to send a message to terminates the received message without forwarding. For example, node N13 having received message 2b in step t+4T_step terminates the procedure since it has no neighbor nodes in the downstream direction that need to be informed of the resource reservations for the route.

If access is scheduled, i.e. each node schedules the nodes next in downstream direction, a slightly different sequence of messages arrives. FIGS. 6a to 6g illustrate the case that node N15 (furthest downstream node) wants to send data to node N1. Thus, in the example of FIGS. 6a to 6g, node N15 is the source node and node N1 is the destination node. The respective route is visualized by the links indicated in bold. In the following example it is assumed without limitation that each node that is part of the route reserves shared resources. First, node N15 informs its scheduling node N12 that it wants to communicate with node N1.

At time t=t0, node N12 sends a resource reservation message 0a to node N6 to inform it about its resource reservation for a shared resource on link L12,15. The resource reservation message 0a may further include the starting time of the resource reservation (starting time t_TX_L12,15) and/or the duration of the resource reservation (duration Duration_L12,15). The destination node N1 may be included in this message as well. Node N12 does not send resource reservation message 0a to nodes N14, N15 since these are leaf nodes and under the control of node N12.

The next step at time t=t0+T_Step is shown in FIG. 6b. As can be seen from FIG. 6b, node N6 is part of the route indicated in resource reservation message 0a. As node N6 is part of the route, it implements, at time t=t0+T_Step, functions described above with respect to node 100 according to the first device embodiment of FIG. 3a. Node N6 modifies the received resource reservation message 0a by adding its resource reservation for link L6,12 to the received resource reservation message 0a. The modified resource reservation message 1a is sent by node N6 to neighbor nodes N3, N11 to inform them about the received resource reservation for shared resources on link L12,15 and its own reservation for link L6,12. The modified resource reservation message 1a may further include the starting time of the resource reservation on links L12,15 and L6,12 (starting time t_TX_L12, 15 and starting time t_TX_L6,12, respectively) and/or the duration of the resource reservation (duration Duration_L12, 15 and duration Duration_L6,12, respectively). The destination node N1 may be included in the modified resource reservation message 1a as well. Node N6 also sends an informing resource reservation message 1b to neighbor node N12 from which it received the resource reservation message 0a. The informing resource reservation message 1b only contains the new resource reservation for link L6,12 (since N12 is the source of resource reservation message 0a it knows the reservations contained therein and does not need them again).

The next step at time t=t0+2T_Step is shown in FIG. 6c. As can be seen from FIG. 6c, node N3 is part of the route indicated in resource reservation message 1a. As node N3 is part of the route, it implements, at time t=t0+2T_Step, functions described above with respect to node 100 according to the first device embodiment of FIG. 3a. Node N3 modifies the received resource reservation message 1a by adding its resource reservation for link L3,6 to the received resource reservation message 1a. The modified resource reservation message 2a is sent by node N3 to node N1 to inform it about the received resource reservation for shared resources on links L12,15, L6,12 and its own reservation for link L3,6. The modified resource reservation message 2a may further include the starting time of the resource reservation (starting time t_TX_L12,15 and starting time t_TX_L6,12 and starting time t_TX_L3,6, respectively) and/or the duration of the resource reservation (duration Duration_L12,15 and duration Duration_L6,12 and duration Duration_L3,6, respectively). The destination node N1 may be included in the modified resource reservation message 2a as well. Node N3 also sends an informing resource reservation message 2b to neighbor node N6 from which it received the resource reservation message 1a. The informing resource reservation message 2b only contains the new resource reservation for link L3,6 (since N6 is the source of resource reservation message 1a it knows the reservations contained therein and does not need them again). Node N11 does not forward the received resource reservation message 1a to node N13 since it is under scheduling control of N11. Node N12 does not forward the received resource reservation message 1b to nodes N14, N15 since they are under scheduling control of N12.

The next step at time t=t0+3T_Step is shown in FIG. 6d. As can be seen from FIG. 6d, node N1 is part of the route indicated in resource reservation message 2a. As node N1 is part of the route, it implements, at time t=t0+3T_Step, functions described above with respect to node 100 according to the first device embodiment of FIG. 3a. Node N1 modifies the received resource reservation message 2a by adding its resource reservation for link L1,3 to the received resource reservation message 2a. The modified resource reservation message 3a is sent by node N1 to neighbor node N2 to inform it about the received resource reservation for shared resources on links L12,15, L6,12, L3,6 and its own reservation for link L1,3. The modified resource reservation message 3a may further include the starting time of the resource reservation (starting time t_TX_L12,15 and starting time t_TX_L6,12 and starting time t_TX_L3,6 and starting time t_TX_L1,3, respectively) and/or the duration of the resource reservation (duration Duration_L12,15 and duration Duration_L6,12 and duration Duration_L3,6 and duration Duration_L1,3, respectively). The destination node N1 may be included in the modified resource reservation 3a as well. Node N1 also sends an informing resource reservation message 3b to neighbor node N3 from which it received the resource reservation message 2a. The informing resource reservation message 3b only contains the new resource reservation for link L1,3 (since N3 is the source of resource reservation message 2a it knows the reservations contained therein and does not need them again). Node N6 does not modify the received informing resource reservation message 2b and just forwards it to nodes N11, N12.

The next step at time t=t0+4T_Step is shown in FIG. 6e. As can be seen from FIG. 6e, node N2 is not part of the route indicated in resource reservation message 3a. As node N2 is not part of the route, it implements, at time t=t0+4T_Step, functions described above with respect to node 200 according to the second device embodiment of FIG. 3b. Node N2 does not modify the received resource reservation message 3a and just forwards it to nodes N4, N5. Node N3 does not modify the received informing resource reservation message 3b and just forwards it to node N6. Node N11 does not forward the received informing resource reservation message 2b to node N13 since it is under scheduling control of N11. Node N12 does not forward the received informing resource reservation message 2b to nodes N14, N15 since they are under scheduling control of N12.

The next step at time t=t0+5T_Step is shown in FIG. 6f. As can be seen from FIG. 6f, node N4 is not part of the route indicated in resource reservation message 3a. As node N4 is not part of the route, it implements, at time t=t0+5T_Step, functions described above with respect to node 200 according to the second device embodiment of FIG. 3b. Node N4, however, does not forward the received resource reservation message 3a to nodes N7, N8 since they are under scheduling control of N4. Node N5 is not part of the route indicated in the received resource reservation message 3a. Node N5 does also not forward the received resource reservation message 3a to nodes N9, N10 since they are under scheduling control of N5. Node N6 does not modify the received informing resource reservation message 3b and just forwards it to nodes N11, N12.

Figure 6G:
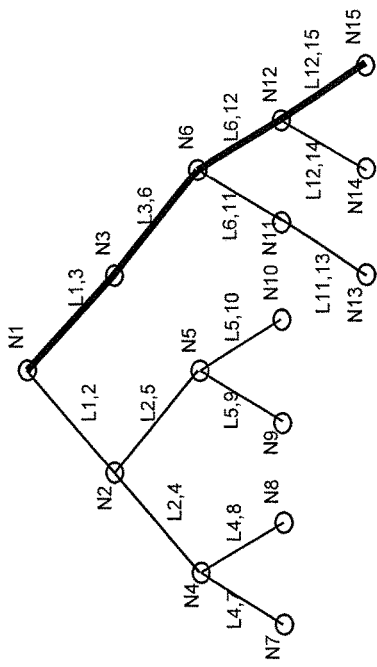

The next step at time t=t0+6T_Step is shown in FIG. 6g. Node N11 does not forward the received informing resource reservation message 3b to node N13 since it is under scheduling control of N11. Likewise, node N12 does not forward the received informing resource reservation message 3b to nodes N14, N15 since they are under scheduling control of N12.

Mixed cases between the general case described with respect to FIGS. 5a to 5f and the scheduled case described with respect to FIGS. 6a to 6g are possible as well, i.e., some access nodes are controlled by access nodes upstream (scheduled case) whereas others are not (general case).

Figure 7:
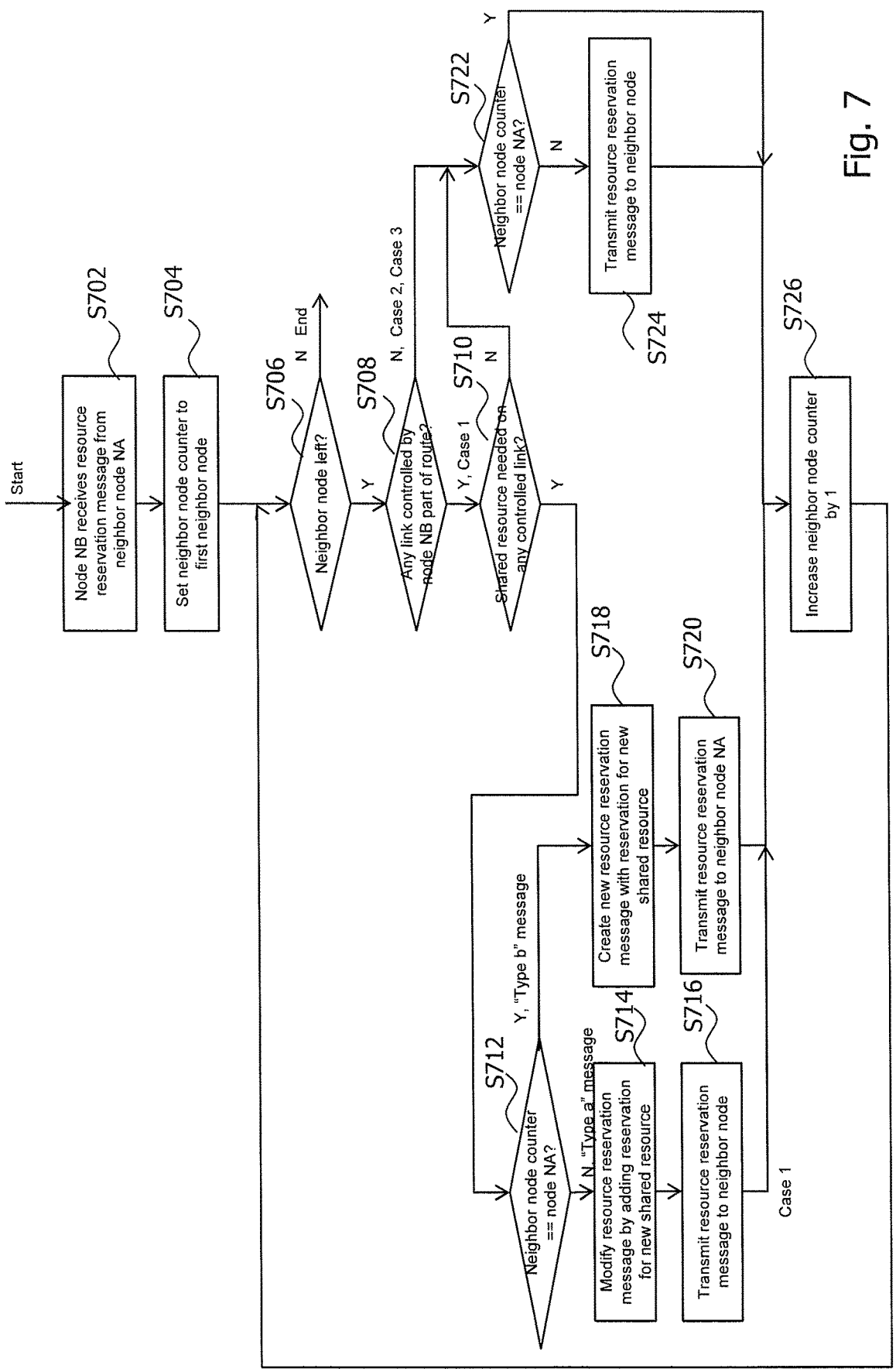
FIG. 7 is a flowchart summarizing the node behavior of the nodes shown in FIGS. 5a to 5f and FIGS. 6a to 6g.

Both of the examples explained above with respect to FIGS. 5a to 5f and 6a to 6g can be described with flow chart depicted in FIG. 7. The difference between these two cases is that the neighbor node counter shown in FIG. 7 does not include leaf nodes since they are "dumb" nodes that are scheduled for the scenario outlined in the schedules case described with respect to FIGS. 6a to 6g. In this respect, a leaf node may correspond to a node which does not have any downstream neighbor nodes. For sake of simplicity only the general case of FIGS. 5a to 5f is described now with respect to FIG. 7. However, by adjusting the neighbor node counter, the scheduled case of FIGS. 6a to 6g may equally be implemented.

For sake of brevity, the following abbreviations are introduced: The terminology "Type a" message will in the following be used for the standard type of message that has been described above as resource reservation messages 0a, 1a, etc in above examples. It contains information on the reservation requests of the route and is modified (if shared resources are required) in each hop along the route. The terminology "Type b" message (e.g., informing resource reservation message 0b, 1b, etc in above examples) may be considered a resource reservation message sent back along the route to inform all nodes that should be informed and that can be reached from the direction the "Type a" message was received at the node. A Type b message is only generated by a node if it reserves new resources.

First, Node NB, for example node N6, receives from node NA, for example node N12 a message of "Type a" (in step S702). In step S704, the neighbor node counter of node NB is set to the first neighbor node of node NB, for example to node N3. Then, in step S706 it is determined by node NB whether any neighbor node is left (in the present example "yes", as node N3 is still left). If so, then it is determined by node NB in step S708 whether there is any link controlled by node NB that is part of the route (in the present example the determination results in "yes" as L3,6 is part of the route). If in the affirmative, it is determined by node NB in step S710 whether there is any controlled link that requires shared resources. For example, it may be determined in step S710 that node N6 as an example of node NB requires shared resources on link L3,6. If node NB requires shared resources, it is determined in step S712 whether the neighbor node counter equals node NA from which the "Type a" message has been received (in the present example, node N6 does not equal node N12). If this is not the case, then node NB adds, to the received message, a resource reservation request for the link concerned in the route (in the present example L3,6) in step S714 and sends the modified resource reservation message to the neighbor node concerned (in the present example neighbor node N3) in the step S716.

In step S726, the neighbor node counter is increased by 1 and the steps described above are repeated for neighbor node N11. As a result, the same steps are performed for node N11 as another example of node NB and the modified resource reservation message is sent to node N11.

In step S726, the neighbor node counter is increased by 1 (so that node N12 is the next neighbor in the present example) and the method returns to step S706 to determine whether any neighbor nodes are left (in the present example "yes" as node N12 is left). The queries S708 and S710 are answered with "yes", so that, in step S712 it is determined whether neighbor node N12 as an example of node NB is the node NA from which the resource reservation message has been received (in the present example the determination results in "yes"). If so, node NB creates a new "Type b" message in step S718 and node NB also sends, in step S720, the "Type b" message to that neighbor node NA from which the original resource reservation message has been received (in the present example to node N12) stating the newly reserved shared resource of Node NB (for link L3,6). If Node NB does not reserve any new resource, no "Type b" message is sent.

Summarizing the above, node NA transmits a resource reservation message ("Type a" message) to all its neighbors except that neighbor from that the original resource reservation message has been received (Node NA) (and optionally except leaf nodes for the scenario outlined with respect to FIGS. 6a to 6g). Further, node NB also sends a "Type b" resource reservation message to that neighbor node from which the original resource reservation message has been received (Node NA) stating the newly reserved shared resource of Node NB. If Node NB does not reserve any new resource, no "Type b" message is sent.

If any of the answers to queries S708 and S710 is negative, the unmodified resource reservation message is forwarded to all its neighbors except that neighbor node from which the original resource reservation message has been received (Node NA) (and optionally except leaf nodes for the scenario outlined with respect to FIGS. 6a to 6g). For example, Node NB receives from node NA a message of "Type a" and is not part of the route. The unmodified resource reservation message is then, in steps S722 and S724, forwarded to all its neighbors except that neighbor from whom the original resource reservation message has been received (Node NA) (and optionally except leaf nodes for the scenario outlined with respect to FIGS. 6a to 6g). To give an example, node N2 receives a "Type a" message from node N1. As node N2 is not part of the route, node N2 forwards the unmodified "Type a" message to neighbor nodes N4 and N5 but not to neighbor node N1 as node N1 is the node from which the "Type a" message has been received. As another example, node NB receives from node NA a message of "Type b" and is not part of the route. The unmodified "Type b" message is then forwarded to all downstream nodes (except leaf nodes for the scenario outlined with respect to FIGS. 6a to 6g). To give an example, a "Type b" resource reservation message received by node N6 is forwarded to nodes N12 and N11 but not to node N3, as node N3 is not a downstream node and as node N3 is the node from the "Type b" message has been received. "Type b" messages are treated in the flow chart of FIG. 7 with a "No" in decision box "Any link controlled by node NB part of route?" of step S708.

Figure 8:
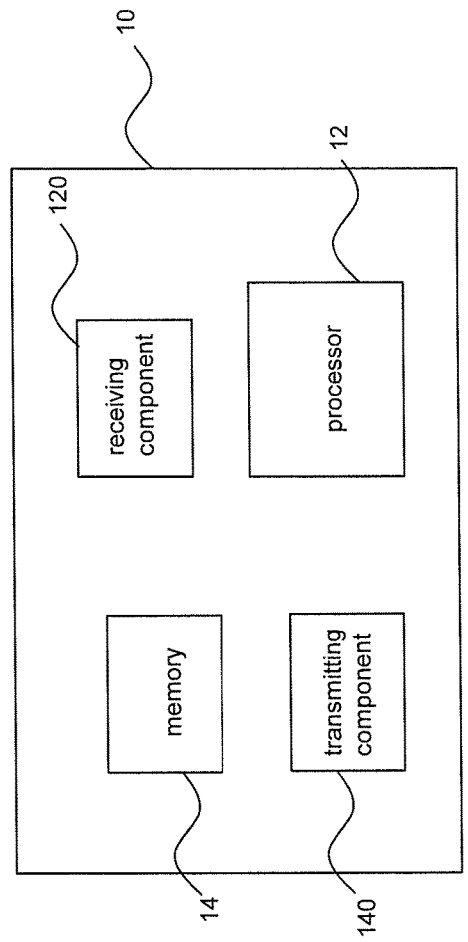
FIG. 8 is a block diagram schematically illustrating a device embodiment of a node.

The details explained above with respect to FIGS. 3a to 7 may be summarized with respect to FIG. 8. FIG. 8 is a block diagram schematically illustrating a device embodiment of a node 10 for reserving communication resources in a wireless communication network. The wireless communication network comprises a plurality of nodes, each of the plurality of nodes being connected to one or more of the plurality of nodes via one or more links. The node 10 comprises a processor 12 and a memory 14. By way of example, the node 10 is described to implement the functionalities of the node 100 according to the first device embodiment. Alternatively or additionally, the node 10 may implement the functionalities of the node 200 according to the second device embodiment. The device 10 may comprise at least one of a transmitting component 140 and a receiving component 120. The memory 14 contains control instructions executable by the processor 12. The receiving component 120 may be configured to receive a resource reservation message including first reservation information indicating one or more communication resources for at least one link of the wireless communication network. The processor 12 may be configured to modify the received resource reservation message by including second reservation information indicating one or more communication resources for a link of the node 10 in the received resource reservation message. The transmitting component 140 may be configured to transmit the modified resource reservation message to one or more neighbor nodes of the node 10.

The invention claimed is:

1. A method of reserving communication resources in a wireless communication network comprising a plurality of nodes, each of the plurality of nodes being connected to one or more of the plurality of nodes via one or more links, the method comprising:
   receiving, by a node of the plurality of nodes and from a neighbor node, a resource reservation message including first reservation information indicating one or more communication resources for at least one link of the wireless communication network, wherein a link is an individual hop in an end-to-end route from a start node to a root aggregation node;
   determining if any link controlled by the node is a part of the end-to-end route;
   modifying, by the node, the received resource reservation message, only if i) the determining is affirmative and ii) the node actually performs reservation of one or more communication resources for the link, by including second reservation information indicating one or more communication resources for a link of the node in the received resource reservation message; and
   transmitting, by the node, the modified resource reservation message to one or more neighbor nodes of the node.

2. The method of claim 1, wherein the step of transmitting comprises transmitting, by the node, the modified resource reservation message to all neighbor nodes of the node except that node of the plurality of nodes from which the resource reservation message has been received.

3. The method of claim 1, wherein the method further comprises transmitting, by the node, the second reservation information to that node of the plurality of nodes from which the resource reservation message has been received.

4. The method of claim 1, wherein the method further comprises:
   generating, by the node, an informing resource reservation message including the second reservation information; and
   transmitting, by the node, the informing resource reservation message to that node of the plurality of nodes from which the resource reservation message has been received.

5. The method of claim 1, wherein the method further comprises forwarding, by the node, the received resource reservation message to one or more neighbor nodes of the node, if the node does not reserve the one or more communication resources for the link of the node.

6. The method of claim 1, wherein the method further comprises forwarding, by the node, the received resource reservation message to one or more neighbor nodes of the node, if the link of the node and the at least one link of the wireless communication network as indicated by the first reservation information are not on a same route from a source node to a destination node of the wireless communication network.

7. The method of claim 1, wherein the method further comprises:
   receiving, by the node, an informing resource reservation message including third reservation information indicating one or more communication resources for one or more other links of the wireless communication network; and
   forwarding, by the node, the informing resource reservation message to one or more neighbor nodes of the node.

8. The method of claim 1, wherein the received resource reservation message includes at least one of:
   information about a destination node of the received resource reservation message; and
   information about a route from a source node to a destination node of the wireless communication network.

9. The method of claim 1, wherein the second reservation information comprises at least one of:
   information indicating a starting time of a reservation of the one or more communication resources indicated by the second reservation information;
   information indicating an end time of the reservation of the one or more communication resources indicated by the second reservation information;
   information indicating a duration of the reservation of the one or more communication resources indicated by the second reservation information;
   information indicating a priority of the reservation of the one or more communication resources indicated by the second reservation information;
   information indicating at least one of the plurality of nodes which is intended to be a receiver of a transmission using the one or more communication resources indicated by the second reservation information; and
   information indicating at least one of the plurality of nodes which is intended to be a transmitter of a transmission using the one or more communication resources indicated by the second reservation information.

10. The method of claim 1, wherein the node is a scheduling node for scheduling one or more of the less root-near nodes.

11. The method of claim 10, wherein the step of transmitting comprises transmitting, by the scheduling node, the modified resource reservation message to one or more neighbor nodes of the scheduling node except that neighbor node of the plurality of nodes from which the resource reservation message has been received and except at least one additional node of the plurality of nodes which is under scheduling control of the scheduling node.

12. The method of claim 10, wherein, if the node receives an informing resource reservation message including third reservation information indicating one or more communication resources for one or more other links of the wireless communication network, and wherein the method further comprises forwarding, by the node, the informing resource reservation message to one or more neighbor nodes of the node except at least one node of the plurality of nodes which is under scheduling control of the node.

13. The method of claim 1, wherein the method further comprises increasing a neighbor node counter after performing the transmitting step so as to determine, for each of the neighbor less root-near nodes, whether and which information is to be transmitted to the respective neighbor less root-near node.

14. The method of claim 1, wherein the communication resources are shared communication resources.

15. The method of claim 1, wherein the node comprises or is configured as an access node, an eNodeB, a base station, a mobile terminal, or a relay node.

16. The method of claim 1, wherein the wireless communication network comprises or is configured as an Ultra Dense Network (UDN).

17. The method of claim 1, wherein the step of modifying the received resource reservation message by including the second reservation information in the received resource reservation message comprises adding the second reservation information indicating the one or more communication resources for the link of the node to the received resource reservation message.

18. A non-transitory computer-readable medium comprising, stored thereupon, a computer program comprising program code portions for execution by a processor of a node in a wireless communication network comprising a plurality of nodes, wherein the program code portions are configured to cause the processor to:
   receive, from a neighbor node, a resource reservation message including first reservation information indicating one or more communication resources for at least one link of the wireless communication network, wherein a link is an individual hop in an end-to-end route from a start node to a root aggregation node;
   determine if any link controlled by the node is a part of the end-to-end route;
   modify the received resource reservation message, only if i) the determining is affirmative and ii) the node actually performs reservation of one or more communication resources for the link, by including second reservation information indicating one or more communication resources for a link of the node in the received resource reservation message; and
   transmit the modified resource reservation message to one or more neighbor nodes of the node.

19. A node in a wireless communication network comprising a plurality of nodes, each of the plurality of nodes being connected to one or more of the plurality of nodes via one or more links, the node comprising:
   a receiver configured to receive, from a neighbor node, a resource reservation message including first reservation information indicating one or more communication resources for at least one link of the wireless communication network, wherein a link is an individual hop in an end-to-end route from a start node to a root aggregation node;
   a processor and memory configured to modify the received resource reservation message, only if i) determining whether any link controlled by the node is a part of the end-to-end route is affirmative and ii) the node actually performs reservation of one or more communication resources for the link, by including second reservation information indicating one or more communication resources for a link of the node in the received resource reservation message; and
   a transmitter configured to transmit the modified resource reservation message to one or more neighbor nodes of the node.

20. The node of claim 19, wherein the node comprises or is configured as an access node, an eNodeB, a base station, a mobile terminal or a relay node.

21. A communication system for reserving communication resources in a wireless communication network, the communication system comprising a plurality of nodes, each of the plurality of nodes being connected to one or more of the plurality of nodes via one or more links, wherein the plurality of the nodes comprises at least one node according to claim 19.

* * * * *